Sept. 10, 1935. E. T. WILLIAMS Re. 19,700

REFRIGERATION APPARATUS

Original Filed Nov. 27, 1929 2 Sheets-Sheet 1

INVENTOR
Edward T. Williams
BY
William G. McKnight
ATTORNEY

Sept. 10, 1935. E. T. WILLIAMS Re. 19,700

REFRIGERATION APPARATUS

Original Filed Nov. 27, 1929 2 Sheets-Sheet 2

INVENTOR
Edward T. Williams
BY
William H. McKnight
ATTORNEY

Reissued Sept. 10, 1935

Re. 19,700

UNITED STATES PATENT OFFICE 19,700

REFRIGERATION APPARATUS

Edward T. Williams, Pelham Manor, N. Y.

Original No. 1,947,574, dated February 20, 1934, Serial No. 410,026, November 27, 1929. Reissue No. 19,595, dated May 28, 1935, Serial No. 754,123, November 19, 1934. This application for reissue July 17, 1935, Serial No. 31,940

45 Claims. (Cl. 62—115)

My invention relates to the art of refrigeration and particularly to refrigerating apparatus of the so-called compression type and still more particularly to compression refrigerating apparatus when used in connection with multiple installations.

This type of installation is used particularly in apartment houses where a refrigerator cabinet containing an evaporator is placed in each of a plurality of apartments and supplied with refrigerant from a single compressor and condenser. It is customary to place as many as thirty evaporators in a single system and hence the quantity of refrigerant contained in such a system is necessarily large. In systems used heretofore, if a leak occurred in one apartment, the entire contents of the system were free to escape through this leak, and this large quantity of refrigerant in a comparatively small apartment was dangerous and was apt to seriously affect the occupants. Even if a comparatively non-poisonous refrigerant is used such as would not be injurious to life if present in small quantities, such as might escape from an individual refrigerating apparatus, such a refrigerant in large quantities has been found to be injurious.

One of the objects of my invention is to provide a multiple refrigerating system employing a smaller quantity of refrigerant for a given number of evaporators than has heretofore been found possible. Another object is to provide safety devices whereby a leak at any point in the system will cause these safety devices to operate so as to isolate that portion of the system and thus prevent the leakage of refrigerant from other parts of the system.

These as well as other objects and advantages will be apparent from the following description taken in connection with the accompanying drawings which form a part of the specification and on which:

Figure 1:
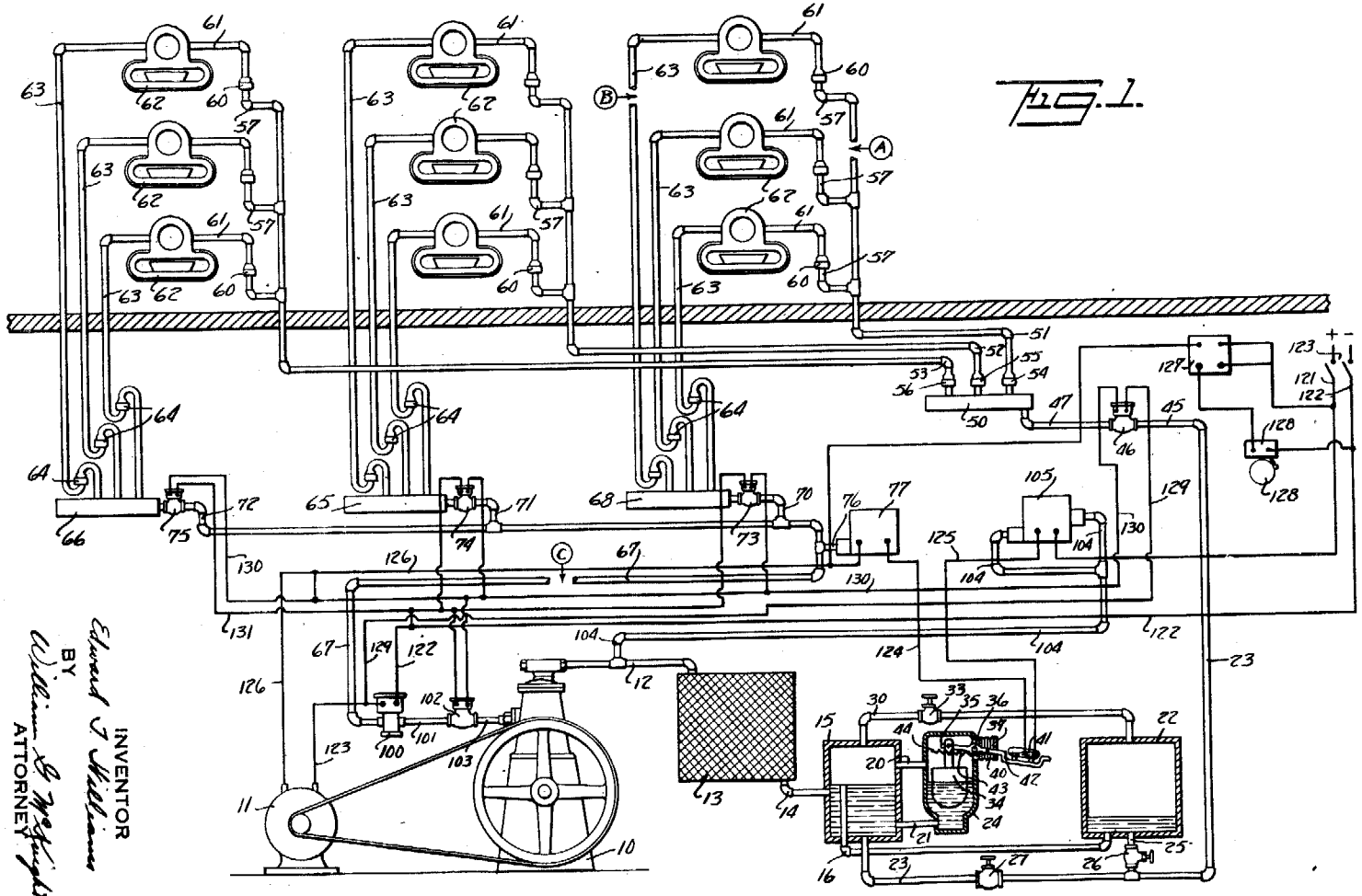
Fig. 1 is a more or less diagrammatic view of a preferred embodiment of my invention.

Referring more particularly to Fig. 1, reference character 10 indicates a compressor which is operatively connected to an electric motor 11 and driven thereby. A conduit 12 connects the discharge port of compressor 10 with a suitable condenser 13 which may be cooled in any desired way, as by air or water. A conduit 14 connects the lower part of condenser 13 with a receiver 15. A conduit 16 communicates with receiver 15 at such a level that approximately two pounds of refrigerant may be contained in the receiver below this level. The other end of conduit 16 communicates with an auxiliary receiver 22. A conduit 23 communicates with the bottom of receiver 15. A conduit 25 connects the bottom of the lower part of auxiliary receiver 22 with conduit 23 and is provided with a manually operable valve 26. A similar valve 27 is placed in conduit 23 between receiver 15 and the point of communication of conduit 25 therewith. A conduit 30 connects the upper part of receiver 15 with auxiliary receiver 22 and is provided with a valve 33. A float chamber 24 is placed adjacent to the lower part of receiver 15 and connected thereto by means of conduits 20 and 21 as shown.

Within float chamber 24 is a float 34 pivotally connected to an arm 35 which is pivoted at 36. Secured to arm 35 is a plate 37 to which is attached a bellows member 40. The other end of bellows 40 is secured to float chamber 24. This arrangement allows a limited movement of arm 35 about point 36, while providing a perfect seal. On the outer end of arm 35 is mounted a mercroid switch 41 arranged so that the electric circuit therethrough will be closed when float 34 is in raised position. Secured to arm 35 at 42 is a tension spring 43, the other end of which is secured to float chamber 24 at 44. The purpose of this spring is to tend to hold arm 35 in an extreme raised or lowered position, but when the force of this spring is overcome by float 34 and arm 35 passes "dead center", the spring quickly snaps the arm into the opposite extreme position and thus quickly either opens or closes mercroid switch 41.

Figure 2:
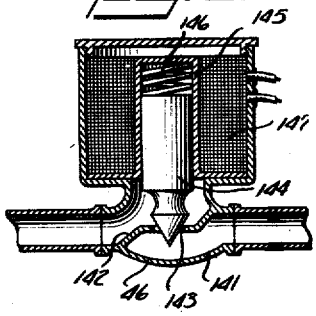
Fig. 2 is a cross-sectional view of a solenoid valve used in connection with my invention.

Conduit 23 connects receiver 15 with solenoid valve 46, which valve is shown in detail in Fig. 2. Valve 46 comprises a housing 141 across which is formed a partition 142. A valve seat 143 is formed in partition 142. A valve member 144 is slidably mounted in a cylindrical member 145 and is forced downwardly to engage seat 143 by a spring 146. Valve member 144, or at least the upper part thereof, is made of magnetic material and around the outside of member 145 is placed a magnetic coil 147. Thus, when current is supplied to coil 147 the resulting magnetic force will act to move valve member 144 upwardly against the force of spring 146 and thus open the valve. When the supply of current fails, the spring will seat valve member 144 which prevents the passage of fluid through the valve.

Figure 3:
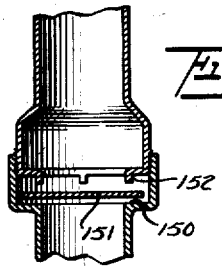
Fig. 3 is a cross-sectional view of a one-way check valve.

A conduit 47 connects the other end of valve 46 with a high side header 50. Connected to header 50 are conduits 51, 52, and 53. Placed in each of these conduits are check valves 54, 55, and 56, respectively. These valves are of similar construction and are shown more in detail in Fig. 3, and comprise a seat 150 upon which a valve plate 151 is arranged to be seated by gravity. Above seat 150 are a number of projections or stops 152 which limit the upward movement of plate 151. In operation fluid tending to pass upwardly through the valve will raise plate 151 against the action of gravity and pass around the valve. However, fluid tending to pass in the opposite direction will force plate 151 against seat 150 and thus the valve will be closed.

Conduits 51, 52, and 53, which may be referred to as riser conduits, extend to the evaporators placed in refrigerator cabinets in the various apartments. The number of riser conduits depends on the number and arrangement of apartments to be served by a single system and there are here shown three riser conduits, each serving three apartments. As the apparatus connected to each riser conduit is similar, only that connected to a single riser conduit will be described.

Connected to riser conduit 51 are conduits 57, one for each refrigerator served by this riser. Placed in conduits 57 are check valves 60, similar to the valve shown in Fig. 3. Conduits 61 connect the other end of these valves to evaporators 62, which are placed in suitable refrigerator cabinets. Connected to the outlets of evaporators 62 are return conduits 63 which communicate with a low side header 63. Placed in each conduit 63 is a check valve 64, similar to the valve shown in Fig. 3. It is necessary to form conduits 63 with a return bend in order that valves 64 shall be in the proper position, as to function properly the flow therethrough must be upwardly.

Figure 5:
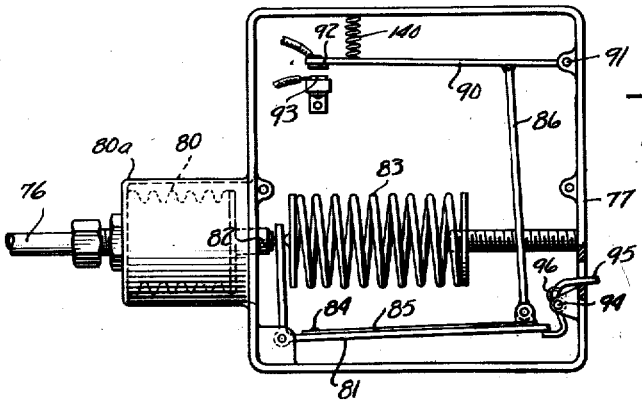
Fig. 5 is a cross-sectional view of another type of pressure-responsive electric switch.

Similar low side headers 65 are provided for the return conduits from the evaporators served by riser conduits 52 and 53, respectively. A conduit 67 is connected to low side headers 68, 65, and 66 by branch conduits 70, 71 and 72, respectively. In each branch conduit is placed a solenoid valve 73, 74, and 75, respectively. These valves are all similar to the valve shown in Fig. 2. Connected to conduit 67 by means of a branch conduit 76 is a pressure-responsive switch 77, which is shown in detail in Fig. 5.

Switch 77 comprises a bellows 80 contained within a housing 80*a* to which is connected conduit 76, so that the pressure existing within the conduit will be communicated to the bellows. Pivoted within the casing of the switch is a bell crank lever 81, the vertical arm of which is acted upon by member 82 actuated by bellows 80. A spring 83 tends to move the vertical arm in a counter-clockwise direction about its fulcrum, which movement is resisted by member 82. Secured to the horizontal arm of bell crank lever 81 at 84 is a strip of resilient metal 85 which in this switch lies flat on the horizontal arm. Secured to the other end of strip 85 is a rod 86, the other end of which is connected to a switch arm 90. In this switch strip 85 has no utility and hence might be omitted and rod 86 connected directly to lever 81. However, this is a standard switch and in a different embodiment, to be described later, the strip is required. Arm 90 is pivoted at one end at 91 and is provided near its other end with a contact 92. Arranged below contact 92 is a similar stationary contact 93. A compression spring 140 tends to force arm 90 downwardly and keep contacts 92 and 93 together. Pivoted in the casing of the switch at 94 is a catch 95, one end of which projects through an opening in the casing. The other end of catch 95 bears against the end of the horizontal portion of bell crank lever 81 when that end is in its lowermost position. A spring 96 is arranged to force catch 95 against the bell crank lever, and when the lever is raised the lower end of catch 95 slips under the lever and prevents it from returning to its lowermost position until the catch has been released by hand.

The operation of this switch is as follows: Spring 83 tends to rotate bell crank lever 81 in a counter-clockwise direction. This motion is resisted by member 82, which is attached to bellows 80. As long as the pressure within bellows 80 is sufficient to overcome the force of spring 83, the lever will remain in the lowermost position. However, if the pressure within the bellows decreases, spring 83 will be able to move bell crank lever 81, which will cause rod 86 to be moved upwardly, to the position shown, thus pivoting switch arm 90 in a clockwise direction. This will cause contacts 92 and 93 to separate against the force of spring 140, thus opening the circuit through the switch. When lever 81 is moved to the upper position catch 95 slips under the end of the lever, as shown, and prevents the lever being moved to its lower position. Hence, even though the pressure in bellows 80 should subsequently increase, it will be unable to re-close the switch due to catch 95, until this catch has been released by hand.

Conduit 67 communicates with a pressure-responsive switch 100 of any suitable type which is designed to open the electric circuit therethrough at a predetermined low pressure and to close the circuit at a predetermined high pressure. A conduit 101 connects switch 100 with a solenoid valve 102, similar to valve shown in Fig. 2. A conduit 103 connects valve 102 with the intake of compressor 10.

Figure 4:
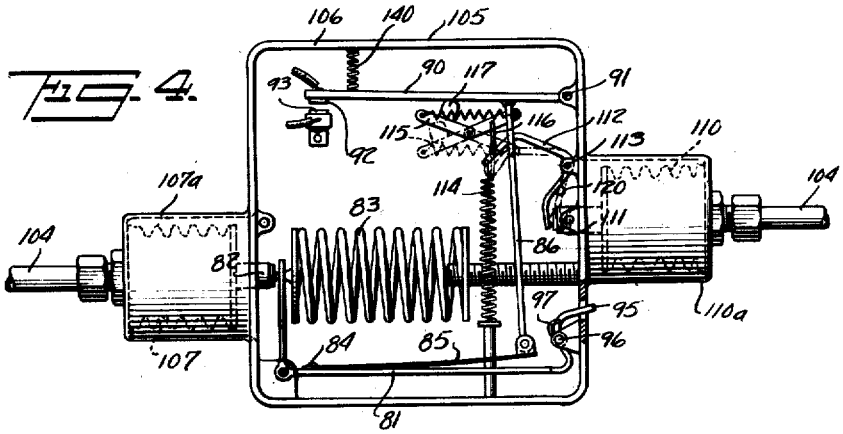
Fig. 4 is a cross-sectional view of a pressure-responsive electric switch.

Connected to conduit 12 by means of a conduit 104 is a pressure-responsive switch 105, shown in detail in Fig. 4.

Switch 105 comprises a casing 106 on one side of which is mounted a bellows 107 within a housing 107*a*, which is connected to conduit 104. A similar bellows 110 is mounted within a housing 110*a* on the other side of the casing and is likewise connected to conduit 104. Switch 105 is similar in some respects to switch 77, but embodies additional features which causes the switch to open at high pressures as well as low pressures. The additional features comprise bellows 110 which actuates a member 111 which in turn actuates a bell crank lever 112 pivoted at 113. A tension spring 114 tends to rotate lever 112 in a counter-clockwise direction. Lever 112 is connected to a snap action mechanism 115 by means of a link 116. Mechanism 115 is provided with a projection 117 arranged to strike the lower side of switch arm 90 and raise the arm and thus separate the contacts 92 and 93. A loosely mounted pin 120 projects through the back of casing 106 and is provided with a spring which tends to force it against bell crank lever 112 when the switch is in closed position.

The operation of this switch is as follows: The operation of bellows 107 in opening the switch is exactly the same as was described in connection with the switch shown in Fig. 5, and therefore need not be repeated here. When the pressure in bellows 110 increases sufficiently, it rotates bell crank lever 112 in a clockwise direction against the force of spring 114. This movement of bell crank lever 112 causes the snap action mechanism 115 to be moved into the position shown, and projection 117 strikes switch arm 90 and raises the arm. This, of course, causes rod 86 to be raised, but does not affect the position of bell crank lever 81 due to the resilient connection furnished by strip 85 between rod 86 and bell crank lever 81. When bell crank lever 112 is moved to this position by bellows 110, pin 120 is able to pass the lever and thus the lever cannot be returned to its original position by spring 114 if the pressure in bellows 110 should drop. In order to return bell crank lever 112 to its original position and thus close the switch, it is necessary to manually pull pin 120 out, whereupon lever 112 will return to its original position and member 120 will be held outwardly by bearing against the lever in this position.

The electric circuit for controlling the above described refrigerating system is as follows: Electric current at suitable voltage is supplied to leads 121 and 122 through a switch 123. Lead 122 is connected to one terminal of pressure-responsive switch 100. The other terminal of switch 100 is connected by a conductor 123 to one terminal of motor 11. Lead 121 is connected to one terminal of switch 105, the other terminal of which is connected by means of a conductor 125 with one terminal of mercroid switch 41. The other terminal of mercroid switch 41 is connected by conductor 124 with one terminal of switch 77, the other terminal of which is connected by means of a conductor 126 with motor 11. Connected in parallel with switches 41, 105 and 77 is an electric relay 127, the windings of which have a comparatively high resistance so that the relay will not be actuated when the circuit through the three switches is closed, but will be actuated when any one of the switches opens. The resistance of the windings of relay 127 is great enough so that sufficient current cannot pass therethrough to actuate motor 11 or hold any of the solenoid valves open. Relay 127 is arranged to close a circuit through an alarm bell 128 or the like whenever the relay is actuated.

Solenoid valves 73, 74, 75 and 102 are connected to a circuit comprising conductors 130 and 131. Conductor 130 is connected to conductor 126, while conductor 131 is connected to conductor 122. Thus it will be seen that current will be supplied to the circuit comprising conductors 130 and 131 regardless of whether or not switch 100 is open or closed, but current will not be supplied to this circuit if switches 41, 105, 77 or any one of them is open. Solenoid valve 46, on the other hand, is connected by conductors 129 and 130 to conductors 123 and 126, respectively, and hence this valve is closed whenever any one of switches 41, 105, 77 or 100 is open.

The operation of the refrigerating system as a whole is as follows: Assume that methyl-chloride, or a similar fluid is the refrigerant employed. The system is charged with this refrigerant and approximately two pounds are contained in receiver 15. Anything in excess thereof will pass through conduit 16 into auxiliary receiver 22. In operation, valve 27 is open, valve 26 is closed and valve 33 is open. The vaporous refrigerant is compressed by compressor 10 and passes through conduit 12 to condenser 13, where it is liquefied due to cooling action. The liquid refrigerant passes through conduit 14 to receiver 15 and from the receiver through conduit 23 valve 46 and thence through conduit 47 to header 50. From header 50 liquid refrigerant passes through riser conduits 51, 52, and 53, and check valves 54, 55, and 56, respectively, to the various evaporators. Following the liquid through the evaporators served by riser 51, it passes through conduits 57, check valves 60 and conduits 61 to the evaporators 62 of this section. In the evaporators the pressure of the liquid refrigerant is reduced by passing through a suitable valve. The lower pressure in the evaporators causes the refrigerant to evaporate. This evaporation requires heat, which is absorbed from the contents of the interior of the refrigerator cabinet within which evaporators 62 are placed. The vaporous refrigerant thus produced in evaporators 62 passes therefrom through conduits 63 and check valves 64 to header 68. From header 68 the vaporous refrigerant is drawn through valve 73, conduits 70 and 67, switch 100, conduit 101, valve 102 and conduit 103, to compressor 10, thus completing its cycle. The refrigerant supplied to risers 52 and 53 passes through the evaporators supplied by these risers and returns to headers 65 and 66, respectively, and thence passes through conduits 71 and 72, respectively and valves 74 and 75, respectively, to conduit 67.

The temperature maintained in the evaporators is a function of the pressure existing therein. The lower the pressure, the lower the corresponding temperature. Hence, this pressure may be utilized to control the operation of the compressor and thus the desired temperature maintained in the evaporators. For this purpose pressure-responsive switch 100 is provided and, for methyl-chloride, is adjusted to open the electric circuit and thus stop motor 11, and close valve 46 when the pressure has been reduced to between six and ten pounds in the evaporators 62, and to close the circuit and start motor 11 and open valve 46 when the pressure in the evaporators has increased to approximately twenty pounds. Valve 46 is closed each time the motor is stopped in order to prevent surging in the system. Surging would occur if several evaporator valves happened to be open, when the compressor stops as under these conditions no refrigerant is being supplied to receiver 15 but the receiver would continue to supply refrigerant to the evaporators the valves of which are open, if valve 46 were not closed. If such surging was permitted, a much larger receiver would be required to contain enough refrigerant to take care of the surge and hence a larger quantity of refrigerant would be present to escape in case of a leak.

Assume now that a leak occurs at the point marked "A" in conduit 51. This leak will allow liquid refrigerant contained in receiver 15, conduit 23, float chamber 24, conduits 46 and 47, header 50 and conduit 51 to start to escape. The contents of the other risers 52 and 53 cannot reach this leak due to the check valves 55 and 56, which prevent flow from the risers into header 50. Likewise the contents of evaporators served by riser 51 cannot reach the leak at "A" due to the check valves 60. The leak at "A" will allow the pressure in the high side of the system back to the compressor to fall. This reduced pressure will be communicated through conduit 104 to pressure-responsive switch 105. The reduced pressure in bellows 107 will cause switch 105 to be opened. Or it may happen that sufficient refrigerant will escape from reseiver 15 and float chamber 24 to allow float 34 to drop and open switch 41 before the pressure is reduced sufficiently to actuate switch 105. The opening of switch 41 or 105 will open the circuit comprised of conductors 130 and 131, which will cause solenoid valve 46 to close, thus isolating the leak between valve 46 and check valves 60. This will occur before a sufficient quantity of refrigerant has escaped to be injurious to persons occupying the apartment in which the leak occurs. The opening of switch 105 or 41 will also open the motor circuit and stop the compressor and also cause bell 128 to ring, which will give immediate warning of the leak.

Next assume a leak to occur in one of the return conduits, for instance, conduit 63 at "B". The pressure within this conduit is between six and twenty pounds gauge, wherefore vaporous refrigerant will escape through the leak. Leakage at this point will continue at a comparatively slow rate until sufficient refrigerant has leaked from the system to either reduce the pressure obtaining in the high side sufficiently to open switch 105, as occurred in the previous case, or to reduce the quantity of liquid refrigerant in the high side sufficiently to allow float 34 to drop and thus open mercroid switch 41. Either or both of these switches will open before a dangerous amount has escaped at "B". Upon the opening of either of these switches the motor will be stopped and solenoid valves 46, 73, 71, 72 and 102 will be closed. The leak will thus be isolated between valve 46 and check valve 64 in conduit 63. Check valve 64 will prevent the passage upwardly through conduit 63 of refrigerant in header 68 and of refrigerant supplied to the header by the other return conduits 63. Likewise, in this case, the bell 128 will ring as soon as either switch 41 or 105 is opened and thus give warning that a leak has occurred.

Next assume a leak to occur at "C" in conduit 67. If methyl-chloride is the refrigerant employed, the pressure within conduit 67 will be between six and twenty pounds and will, of course, drop to zero pounds gauge when the leak occurs. This will immediately cause pressure responsive switch 77 to open, as this switch is adjusted to open at a pressure just above zero pounds gauge, say, approximately, at one pound. The opening of switch 77 will open the motor circuit, thus stopping the motor, and will also open the circuit comprised of conductors 130 and 131, which will cause the solenoid valves to close. The leak at "C" will then be isolated between solenoid valves 73, 74, 75 and 102, and the amount of refrigerant which will have escaped will be negligible. The opening of switch 77 will cause bell 128 to give warning of the leak.

Switch 105 is arranged to open upon the occurrence of an abnormal pressure in the high side as well as in case of a subnormal pressure so that a dangerously high pressure may not be built up therein. Such a pressure might result from several causes, such as the failure of valve 43 to open when the motor starts or a failure of cooling water in case the condenser is water cooled.

Excess refrigerant placed in a system when initially charged will pass through conduit 16 to auxiliary receiver 22, where it will remain as it cannot flow back into circulation as long as valve 26 is closed. The provision of auxiliary receiver 22 prevents an excessive quantity of refrigerant being present in the receiver 15 of the system and thus maintains at a minimum the amount of refrigerant that may escape from a leak. Due to the small quantity of refrigerant present in receiver 15, a leak will cause the high side pressure to drop rapidly and thus cause switch 105 to open and of course float chamber 24 will become emptied much sooner with a small quantity of liquid in the receiver 15 than it would if a larger quantity were present. In case a leak occurs and is repaired, any excess refrigerant in auxiliary receiver 22 may be introduced directly into the receiver 15 to make up for refrigerant lost through the leak by a proper manipulation of the manually operable valves. To do this, valve 26 should be opened and valve 27 closed. Liquid refrigerant contained in receiver 22 will then pass through conduit 25 into conduit 23. When all of the liquid refrigerant has been thus forced out of auxiliary receiver 22, the valves are returned to their former position and liquid refrigerant supplied from receiver 15 through conduit 23. Valve 26 may be provided with a lock so that it may be opened and refrigerant introduced into the circulating system only by a duly authorized person.

I have shown and described a system employing pressure control of the compressor. With such control I prefer the use of float valves for regulating the supply of liquid refrigerant to the evaporators. My safety system is equally applicable to other regulation combinations and is independent of the normal control of the refrigerating system. My safety arrangements may be used on a system employing pressure operated expansion valves to control the supply of refrigerant to the evaporators or expansion valves operated by a plurality of impulse sources. With expansion valves of the last mentioned types, thermostatic control of the motor may be used instead of pressure control.

While I have shown a more or less specific embodiment of my invention, it is to be understood that this has been done for purposes of illustration and that the invention is not limited thereto. It will be evident that parts of the system which I have shown may be used separately. Other refrigerants than those described may be employed and their use in combination with such a system falls within the scope of the invention, which is to be limited by the appended claims viewed in the light of the prior art.

What I claim is:

1. A refrigerating system comprising a compressor, a condenser, evaporation means, conduits connecting said compressor, condenser and evaporation means and automatic means for dividing said system into isolated sections operable upon the occurrence of abnormal change in pressure at any point in the system.

2. A refrigerating system comprising a compressor, a condenser, evaporation means, conduits connecting said compressor, condenser and evaporation means, valves in said conduits and pressure-responsive means operable upon the reduction of pressure within said system resulting from a leak in said system for closing said valves to divide said system into isolated sections.

3. A refrigerating system comprising a compressor, a condenser, evaporation means, conduits connecting said compressor, condenser and evaporation means, valves in said conduits and liquid level responsive means operable upon the reduction of the quantity of liquid refrigerant contained within said system resulting from a leak in said system for closing said valve to divide said system into isolated sections.

4. A refrigerating system comprising a compressor, a condenser, evaporation means, conduits connecting said compressor, condenser and evaporation means, valves in said conduits and pressure-responsive means operable upon the increase of pressure within said system for closing said valves to divide said system into isolated sections.

5. A refrigerating system comprising a compressor, a condenser, an evaporator, means including a conduit for supplying said evaporator with liquid refrigerant from said condenser, a one-way valve in said conduit adjacent said evaporator, means for conveying vaporous refrigerant from said evaporator to said compressor, a second valve in said conduit and means for closing said second valve when the pressure in said conduit is below normal.

6. A refrigerating apparatus comprising a compressor, a condenser, a receiver, an evaporator, means including a conduit for supplying said evaporator with liquid refrigerant from said receiver, a one-way valve in said conduit adjacent said evaporator, means for conveying vaporous refrigerant from said evaporator to said compressor, an electrically actuated valve in said conduit and means including a float operated switch responsive to the liquid level in said receiver for closing said valve.

7. A refrigerating apparatus comprising a compressor, a condenser, evaporation means, means including a first conduit for supplying said evaporation means with liquid refrigerant from said condenser, means including a second conduit for conveying vaporous refrigerant from said evaporation means to said compressor, an electrically actuated valve in each of said conduits and means including a pressure responsive switch for closing said valves when the pressure in said first conduit is below normal.

8. A refrigerating apparatus comprising a compressor, a condenser, evaporation means, means including a first conduit for supplying said evaporation means with liquid refrigerant from said condenser, means including a second conduit for conveying vaporous refrigerant from said evaporation means to said compressor, an electrically actuated valve in each of said conduits and means including a pressure responsive switch for closing said valves when the pressure in said first conduit is above normal.

9. A refrigerating apparatus comprising a compressor, a condenser, evaporation means, means including a first conduit for supplying said evaporation means with liquid refrigerant from said condenser, means including a second conduit for conveying vaporous refrigerant from said evaporation means to said compressor, an electrically actuated valve in each of said conduits and means including a pressure responsive switch for closing said valves when the pressure in said first conduit is other than normal.

10. A refrigerating apparatus comprising a compressor, a condenser, evaporation means, means including a first conduit for supplying said evaporation means with liquid refrigerant from said condenser, means including a second conduit for conveying vaporous refrigerant from said evaporation means to said compressor, an electrically actuated valve in each of said conduits and means including a pressure responsive switch for closing said valves when the pressure in said second conduit is below normal.

11. A refrigerating apparatus comprising a compressor, a condenser, a receiver, evaporation means, means including a first conduit for supplying said evaporation means with liquid refrigerant from said receiver, means including a second conduit for conveying vaporous refrigerant from said evaporation means to said compressor, an electrically actuated valve in each of said conduits and means including a float operated switch responsive to liquid conditions in said receiver for closing said valves.

12. A refrigerating apparatus comprising a compressor, a condenser, a receiver, an auxiliary receiver, an evaporator, conduits connecting said compressor with said condenser, said condenser with said receiver, said receiver with said evaporator and said evaporator with said compressor, a conduit connecting said receiver with said auxiliary receiver and means to regulate flow of fluid through said last mentioned conduit so as to limit the quantity of liquid in said receiver.

13. A refrigerating system comprising a compressor, a condenser, a receiver, an auxiliary receiver, evaporation means, conduits connecting said compressor with said condenser, said condenser with said receiver, said receiver with said evaporation means and said evaporation means with said compressor, a conduit connecting said receiver with said auxiliary receiver, means to regulate flow of fluid through said last mentioned conduit so as to limit the quantity of liquid in said receiver, electrically actuated valves for dividing said system into isolated sections and means including a float operated switch responsive to liquid conditions in said receiver for closing said valves.

14. A refrigerating system comprising a compressor, a condenser, a receiver, an auxiliary receiver, evaporation means, conduits connecting said compressor with said condenser, said condenser with said receiver, said receiver with said evaporation means and said evaporation means with said compressor, a conduit connecting said receiver with said auxiliary receiver, means to regulate flow of fluid through said last mentioned conduit so as to limit the quantity of liquid in said receiver, electrically actuated valves for dividing said system into isolated sections and means including a pressure responsive switch for closing said valves when the pressure in said receiver is below normal.

15. A refrigerating system comprising a compressor, a condenser, a plurality of evaporators, a low side header, means comprising a conduit and branch conduits connecting said condenser with said evaporators, a one-way valve in each of said branch conduits, return conduits connecting said evaporators with said low side header, a one-way valve in each of said return conduits, a magnetically actuated valve in said first mentioned conduit, a conduit connecting said low side header with said compressor, a magnetically actuated valve in said last mentioned conduit and means comprising a pressure responsive switch for closing said magnetically actuated valves when a subnormal pressure exists in said system.

16. A refrigerating system comprising a compressor, a condenser, a plurality of evaporators, a low side header, means comprising a conduit and branch conduits connecting said condenser with said evaporators, a one-way valve in each of said branch conduits, return conduits connecting said evaporators with said low side header, a one-way valve in each of said return conduits, a magnetically actuated valve in said first mentioned conduit, a conduit connecting said low side header with said compressor, a magnetically actuated valve in said last mentioned conduit and means comprising a pressure responsive switch for closing said magnetically actuated valves when a pressure above normal exists in said system.

17. A refrigerating system comprising a compressor, a condenser, a receiver, a plurality of evaporators, a low side header, means comprising a conduit and branch conduits connecting said condenser with said evaporators, a one-way valve in each of said branch conduits, return conduits connecting said evaporators with said low side header, a one-way valve in each of said return conduits, a magnetically actuated valve in said first mentioned conduit, a conduit connecting said low side header with said compressor, a magnetically actuated valve in said last mentioned conduit and means comprising a float actuated switch responsive to liquid conditions in said receiver for closing said valve.

18. A refrigerating system comprising a compressor, a condenser, a high side header, a plurality of evaporators, a plurality of low side headers, a conduit connecting said condenser with said high side header, a magnetically actuated valve in said conduit, means comprising a plurality of riser conduits each connected with a plurality of branch conduits for connecting said high side header with said evaporators, a one-way valve in each of said riser conduits, a one-way valve in each of said branch conduits, a plurality of return conduits connecting said evaporator with said low side headers, one-way valves in each of said return conduits, means comprising a main return conduit and branch conduits connecting said low side headers with said compressor, a magnetically actuated valve in said main return conduit and in each of said last mentioned branch conduits, and means comprising a pressure responsive switch for closing all the aforesaid magnetically actuated valves when a subnormal pressure exists in said system.

19. A refrigerating system comprising a compressor, a condenser, a high side header, a plurality of evaporators, a plurality of low side headers, a conduit connecting said condenser with said high side headers, a magnetically actuated valve in said conduit, means comprising a plurality of riser conduits each connected with a plurality of branch conduits for connecting said high side header with said evaporators, a one-way valve in each of said riser conduits, a one-way valve in each of said branch conduits, a plurality of return conduits connecting said evaporators with said low side headers, one-way valves in each of said return conduits, means comprising a main return conduit and branch conduits connecting said low side headers with said compressor, a magnetically actuated valve in said main return conduit and in each of said last mentioned branch conduits, and means comprising a pressure responsive switch for closing all the aforesaid magnetically actuated valves when a pressure greater than normal exists in said system.

20. A refrigerating system comprising a compressor, a condenser, a receiver, a high side header, a plurality of evaporators, a plurality of low side headers, a conduit connecting said condenser with said high side headers, a magnetically actuated valve in said conduit, means comprising a plurality of riser conduits each connected with a plurality of branch conduits for connecting said high side header with said evaporators, a one-way valve in each of said riser conduits, a one-way valve in each of said branch conduits, a plurality of return conduits connecting said evaporators with said low side headers, one-way valves in each of said return conduits, means comprising a main return conduit and branch conduits connecting said low side headers with said compressor, a magnetically actuated valve in said main return conduit and in each of said last mentioned branch conduits, and means comprising a float actuated switch responsive to liquid conditions in said receiver for closing all the aforesaid magnetically actuated valves.

21. A refrigerating system comprising a plurality of evaporators, means for supplying refrigerant to said evaporators, said means comprising a header, a plurality of riser conduits connected to said header and a plurality of branch conduits connecting each evaporator with one of said riser conduits, a valve in each of said riser conduits for preventing flow therethrough into said header and a valve in each of said branch conduits for preventing flow therethrough into the respective riser conduits.

22. An electrically operated refrigerating system comprising a compressor, a condenser, evaporation means, conduits connecting said compressor, condenser and evaporation means, valves in said conduits, and means for closing said valves to divide said system into isolated sections operable upon the failure of electric current for operating the system.

23. An electrically operated refrigerating system comprising a compressor, a condenser, an evaporator, means including a conduit for supplying said evaporator with liquid refrigerant from said condenser, a one-way valve in said conduit adjacent said evaporator, means for conveying vaporous refrigerant from said evaporator to said compressor, a second valve in said conduit and means for closing said second valve upon the failure of electric current for operating said system.

24. An electrically operated refrigerating system comprising a compressor, a condenser, evaporation means, means including a first conduit for supplying said evaporation means with liquid refrigerant from said condenser, means including a second conduit for conveying vaporous refrigerant from said evaporation means to said compressor, an electrically actuated valve in each of said conduits and means for closing said valves upon a failure of electric current for operating said system.

25. An electrically operated refrigerating system comprising a compressor, a condenser, a receiver, an auxiliary receiver, evaporation means, conduits connecting said compressor with said condenser, said condenser with said receiver, said receiver with said evaporation means and said evaporation means with said compressor, a conduit connecting said receiver with said auxiliary receiver, means to regulate flow of fluid through said last mentioned conduit so as to limit the quantity of liquid in said receiver, valves for dividing said system into isolated sections and means for closing said valves upon a failure of electric current for operating said system.

26. An electrically operated refrigerating system comprising a compressor, a condenser, a plurality of evaporators, a low side header, means comprising a conduit and branch conduits connecting said condenser with said evaporators, a one-way valve in each of said branch conduits, return conduits connecting said evaporators with said low side header, a one-way valve in each of said return conduits, a magnetically actuated valve in said first mentioned conduit, a conduit connecting said low side header with said compressor, a magnetically actuated valve in said last mentioned conduit and means for closing said magnetically actuated valves upon a failure of electric current for operating said system.

27. An electrically operated refrigerating system comprising a compressor, a condenser, a high side header, a plurality of evaporators, a plurality of low side headers, a conduit connecting said condenser with said high side header, a magnetically actuated valve in said conduit, means comprising a plurality of riser conduits each connected with a plurality of branch conduits for connecting said high side header with said evaporators, a one-way valve in each of said riser conduits, a one-way valve in each of said branch conduits, a plurality of return conduits connecting said evaporator with said low side headers, one-way valves in each of said return conduits, means comprising a main return conduit and branch conduits connecting said low side headers with said compressor, a magnetically actuated valve in said main return conduit and in each of said last mentioned branch conduits and means for closing all the aforesaid magnetically actuated valves upon a failure of electric current for operating said system.

28. That improvement in the art of refrigeration through the agency of an electrically operated refrigerating system which comprises producing an electromagnetic field with the electric current for operating the system and dividing the system into isolated sections upon decrease in strength of said field below a predetermined value.

29. A compressor, a condenser, and an evaporator connected to form a refrigerating system, and automatic means for dividing the system into isolated sections operable upon a predetermined fall in liquid level in the high pressure side of the system.

30. A compressor, a condenser, and an evaporator connected to form a refrigerating system, and automatic means for stopping the compressor and for dividing the system into isolated sections operable upon a predetermined fall of the liquid level in the high pressure side of the system.

31. A compressor, a condenser, and an evaporator connected to form a refrigerating system, and automatic means for stopping the compressor and for operating a signal operable upon a predetermined fall of the liquid level in the high pressure side of the system.

32. A compressor, a condenser, and an evaporator connected to form a refrigerating system, and automatic means for dividing the system into isolated sections and for operating a signal operable upon a predetermined fall of the liquid level in the high pressure side of the system.

33. A compressor, a condenser, and an evaporator connected to form a refrigerating system, electrical means for supplying power to the system, and automatic means for dividing the system into isolated sections operable upon a predetermined fall in liquid level in the high pressure side of the system.

34. That improvement in the art of refrigeration which comprises altering an electric circuit due to a predetermined fall in liquid level in the high pressure side of the system and dividing the system into isolated sections due to the alteration of said circuit.

35. In an electrically operated refrigerating system means for producing an electromagnetic field, utilizing electric current for operating the system, means for dividing the system into isolated sections operative upon decrease in strength of said field below a predetermined value, and additional means for dividing the system into isolated sections upon a predetermined fall of liquid level in the high pressure side of the system.

36. In a refrigerating system employing electric current means for automatically dividing the system into isolated sections, and means responsive to a predetermined fall of liquid level in the high pressure side of the system for effecting said automatic division, and additional means operable upon the failure of electric current for dividing the system into isolated sections.

37. A compressor, a condenser, and an evaporator connected to form a refrigerating system, a signal associated with said system, and automatic means for operating said signal, said automatic means being adapted to be actuated upon a predetermined loss of fluid from the high pressure side of the system.

38. A compressor, a condenser, and an evaporator connected to form a refrigerating system, a signal associated with said system, and automatic means for operating said signal, said automatic means being adapted to be actuated upon a predetermined loss of fluid from the system.

39. The improvement in the art of refrigeration which comprises dividing a refrigerating system into isolated sections in response to a predetermined alteration of an electrical circuit forming a part of the system.

40. A refrigerating system including condensing and evaporating means connected in series, and means adapted to operate upon the occurrence of a leak in any portion of said system to subdivide the system into a number of isolated sections.

41. A refrigerating system comprising interconnected compressing, condensing and evaporating means, valves in said system, and means adapted to operate said valves upon the occurrence of a leak in any portion of said system for subdividing said system into a plurality of independently isolated sections whereby said leak will only permit the escape of refrigerant from the respective isolated section.

42. A refrigerating system comprising interconnected compressing, condensing and evaporating means, valves in said system, and means adapted to operate said valves responsive to a predetermined loss of fluid from said system for subdividing the system into a plurality of independently isolated sections.

43. A refrigerating system comprising interconnected compressing, condensing and evaporating means, valves in said system, and means adapted to operate said valves responsive to either a predetermined loss of fluid from the system or in response to an abnormal drop in pressure resulting from a leak in the system for subdividing said system into a plurality of independently isolated sections.

44. A refrigerating system comprising interconnected compressing, condensing and evaporating means, valves in said system, and means operable to close said valves upon a leak or loss of fluid or abnormal pressure change or abnormal change of liquid level for subdividing said system into a plurality of independent isolated sections.

45. A refrigerating system comprising evaporating, condensing and other interconnected elements, valves in said system, and means adapted to operate said valves to subdivide said system into a plurality of independent sections and operable subject to any one of a number of conditions including loss of fluid, abnormal pressure change or abnormal liquid level change.

EDWARD T. WILLIAMS.